United States Patent [19]

Palmer

[11] 4,310,905
[45] Jan. 12, 1982

[54] ACOUSTICAL MODULATOR FOR FIBER OPTIC TRANSMISSION

[75] Inventor: John P. Palmer, Pomona, Calif.

[73] Assignee: General Dynamics, Pomona Division, Pomona, Calif.

[21] Appl. No.: 123,040

[22] Filed: Feb. 20, 1980

[51] Int. Cl.³ .............................................. H04R 23/00
[52] U.S. Cl. .................................. 367/140; 367/149;
350/96.15
[58] Field of Search .............................. 367/140, 149;
350/96.15

[56] References Cited

U.S. PATENT DOCUMENTS

| | | | |
|---|---|---|---|
| 3,175,088 | 3/1965 | Herriott | 250/199 |
| 3,580,082 | 5/1971 | Strack | 73/406 |
| 3,831,137 | 8/1974 | Cuomo | 367/141 |
| 3,903,496 | 9/1975 | Stimler | 367/3 |
| 3,940,608 | 2/1976 | Kissinger et al. | 350/96 B |
| 4,059,338 | 11/1977 | Hartelius, Jr. | 350/96 C |
| 4,071,753 | 1/1978 | Fulenwider et al. | 350/96 C |
| 4,158,310 | 6/1979 | Ho | 73/705 |

OTHER PUBLICATIONS

Jeunhomme et al., Applied Physics Letters, vol. 29, No. 8, Oct. 1976, pp. 485–487.

*Primary Examiner*—Richard A. Farley
*Attorney, Agent, or Firm*—Henry M. Bissell; Edward B. Johnson

[57] ABSTRACT

An acoustical sensor utilizing fiber optic transmission including an optical signal generator, a first single-fiber transmission line connected to the generator, and a coupler for receiving signals from the first line and transmitting the signals to a second single fiber which directs the signals to an acoustically sensitive reflective surface. The surface modulates the signal in accordance with acoustical signals applied to it and reflects at least part of the signal back to the fiber where it is transmitted to a third fiber by the coupler and then transmitted to an electronic receiver.

10 Claims, 5 Drawing Figures

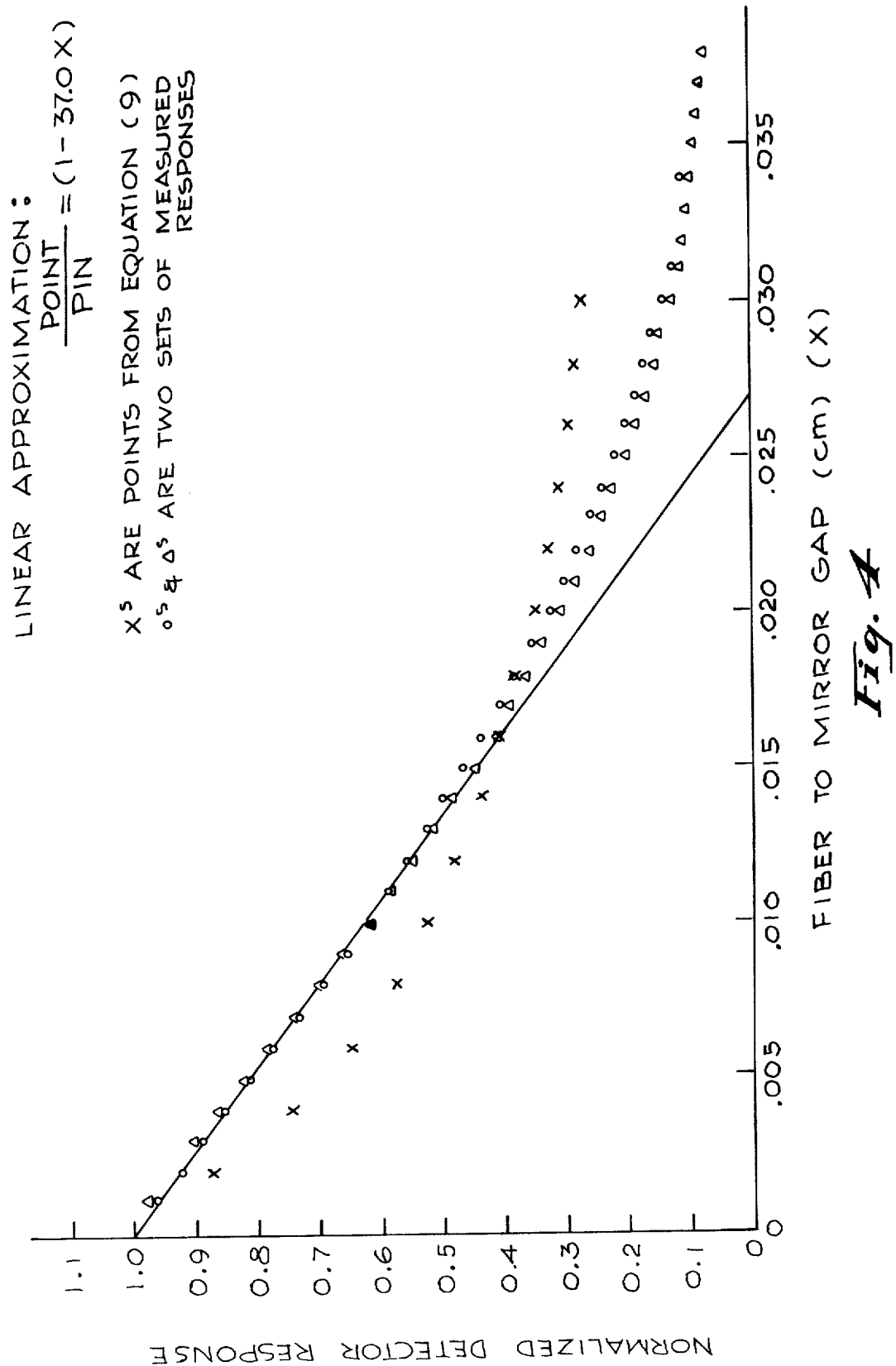

ACOUSTICAL MODULATOR FOR FIBER OPTIC TRANSMISSION

BACKGROUND OF THE INVENTION

1. Field of the Invention

The present invention is generally related to the sensing and transmission of acoustical signals through the use of fiber optics. More particularly, the present invention is directed to the use of a unidirectional coupler in conjunction with single optical fibers to produce an effective acoustical sensor apparatus.

2. Description of the Prior Art

Fiber optics have been suggested for use in telephone systems, and in fact prototypes are now in use. It has been projected, based on demonstrations, that most new telephone lines in the 21st century will be optical fibers. They have been shown to be useful in short-range telephone applications, such as within a telephone transceiver. One system has demonstrated delivery of both the power for the electronic circuitry in the telephone transceiver and transmission of audio signals by optical fibers. The suggested systems, however, still utilize opto-electronic transducers to convert light signals to electronic signals and vice versa. In addition, electro-acoustic transducers are used to convert electronic signals to acoustical signals and vice versa. Direct conversion of the acoustic signals to an optical signal has been explored but with only limited success in the past.

It has been recently discovered that optical transmission properties for fibers are pressure sensitive and that when a sound wave is transmitted through a fluid medium, such as air or water, to a coiled optical fiber a significant modulation of the light beam in the fiber results. However, the interaction is weak and a large bulky coil of fiber is required. Other methods, such as vibrating mirrors positioned at the end of a fiber, have not been found to be practical in telephone receiver use.

One system utilizing optical transducers, lenses and mirrors, without using optical fibers is disclosed in U.S. Pat. No. 3,175,088 to Herriott. Herriott discloses the basic concept of utilization of reflection of light by an acoustically sensitive surface to produce an acoustical signal. Fulenwider in U.S. Pat. No. 4,071,753, on the other hand, utilizes various means for adjusting the alignment of two fibers, positioned in an end-to-end relationship, to vary the light transmitted from fiber to fiber. Fulenwider also discloses a pressure sensitive membrane with a reflective surface.

Numerous patents suggest the use of plural fibers joined in a bundle, some of which are utilized to transmit an optical signal to an acoustically sensitive surface and some of which are used to return it to a transducer. Examples include U.S. Pat. Nos. 3,831,137 of Cuomo; 3,903,496 of Stimler; 3,940,608 of Kissinger; and 4,158,310 of Ho.

Strack in U.S. Pat. No. 3,580,082 discloses a pressure transducer that utilizes a single source fiber. The transducer is manufactured so that the source fiber is surrounded by plural, smaller, receiver fibers. The signal is transmitted through the source fiber and reflected off an acoustically sensitive membrane to the surrounding small transmission fibers to generate the resulting modulated signal.

All of these systems require a minimum of two fibers, one for transmission and one for reception, in order to be able to function. Thus the alignment between the two fibers is critical so that the signal modulation obtained will be maximized.

SUMMARY OF THE INVENTION

The present invention provides a means for sensitive, low-cost detection of acoustical signals. The signals are converted directly into a modulated light beam without intermediate conversion into electronic signals. The acoustical detector can be mounted at the end of a long optical fiber for remote positioning and the single optical fiber light transmission and reception medium between the acoustical detector and the electro-optical detector is capable of transmitting signals at much higher frequencies and over much greater distances than coaxial cable. Also, since electronic hardware is not required in the probes, the probe can be used in electrically hostile environments such as under water or in high electromagnetic fields. In addition, the use of a single transmission and reception fiber at the acoustical pick-up point results in a more accurate, less expensive device, which is significantly less affected by manufacturing problems, does not require special lens structures and is very efficient.

The device of the invention also serves effectively for position sensing such as, for example, in the use of profileometers in thin-film electronic device evaluation. The invention may also be useful in developing output signals used to drive numerically controlled machine tools and in contour reading systems in a manner comparable to the non-contacting optical probe of U.S. Pat. No. 3,671,126.

In the apparatus of the present invention a single fiber is used to transmit light in both directions. It is connected, at one end, to a three-port directional coupler. The coupler is described in more detail in applicant's concurrently filed application Ser. No. 123,034, entitled OPTICAL FIBER LAUNCH COUPLER and assigned to the assignee of this application. The other two ports of the coupler are input and output ports. The input port is connected to a light source such as a light-emitting diode, an incandescent bulb or other light generator. The output port is connected to a light detector such as a photodiode, and the photodiode is connected to receiving and amplification circuitry. Differing light sources can be utilized if desired, as well as different light sensors, and the concept of the present invention would still be applicable. The LED generates a light signal which is transmitted by fiber optics to the coupler. In the coupler a single-fiber strand couples the signal into the transmission fiber. The signal in the transmission fiber exits the coupler and travels to the end of the transmission fiber where it exits in a diverging beam. The diverging beam is reflected from the metallized surface which is usually a structural part of a pressure sensitive membrane. When the membrane is caused to vibrate in response to the fluctuating pressure associated with sound waves, the reflecting surface is caused to move in a direction parallel to the axis of the diverging beam and the reflected beam. As a result, only a fraction of the reflected light beam is intercepted by the end of the transmission fiber. This is due both to the diverging character of the beam, and the changing position of the reflective surface. The amount of light that reenters the core of the single-fiber transmission line depends on the distance between the fiber and the reflecting surface.

The reflected signal then travels back to the coupler and exits the coupler along the receiving line, with only a very small portion of it being transmitted back to the generating line. The receiving fiber line is coupled with, for example, a photodiode which is located at the end of the receiving fiber. The photodiode converts the optical signal into an electrical signal for processing and data transmission to storage or for other uses.

In this manner, a highly efficient acoustically sensitive fiber optic unit is generated.

BRIEF DESCRIPTION OF THE DRAWINGS

A better understanding of the present invention may be had from a consideration of the following detailed description, taken in conjunction with the accompanying drawings in which:

FIG. 4 is a graph showing the theoretical and measured test results for the invention.

DESCRIPTION OF THE PREFERRED EMBODIMENTS

The acoustical sensor of the present invention will be described in general terms herein. However, it can be seen that such units are easily coupled to the appropriate hardware for use in telephones, hydrophones, and other sound sensing devices.

Figure 1:
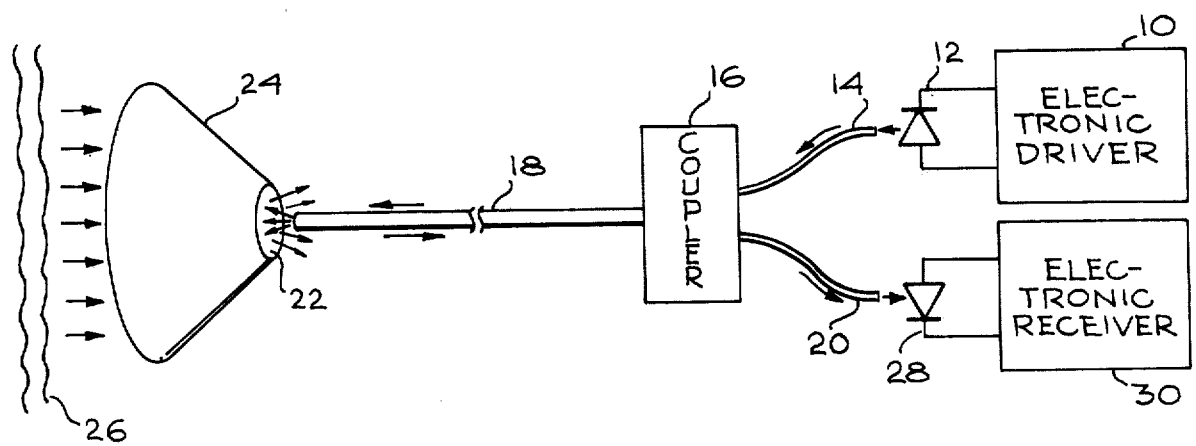
FIG. 1 is a schematic of the system of the present invention.

In FIG. 1, the schematic shows electronic driver 10 which may be either D.C., or A.C., as will be described hereinbelow. The driver is electrically connected to a light-emitting diode 12 which is coupled by conventional means, not shown, to input optical fiber 14. The input optical fiber is of the single-fiber type and is preferably a glass-clad-glass fiber such as a Galite fiber manufactured by Galileo Electro-Optics, Inc. Conventional in-line connectors can be used on the input line as needed.

Coupler 16 is a directional coupler, having only three active ports. The preferred coupler is disclosed in the above-referenced copending application and is formed by lapping the smaller input fiber at an angle to its axis to produce an elliptical surface which passes through the cladding on the fiber at the upstream end of the elliptical shape, and passes through the whole of the central core of the fiber. This flat, elliptical surface is coupled directly to an elliptical surface of substantially the same size formed on another clad fiber which constitutes, in the preferred form, both the transmission and the reception line in the apparatus of the present invention. The second fiber is larger in diameter and has the outer cladding and a sufficient amount of the central core lapped away to produce a surface area of approximately the same size as the elliptical surface area on the smaller launch fiber.

By utilizing the described single-fiber directional coupler, unidirectional light transmission from transmission line 14 through coupler 16 and outward through transmission line 18 is effected. Only a very small percentage of the light, i.e. about 5%, is reflected to reception line 20. However, when light is transmitted from reflective surface 22 toward coupler 16 through transmission line 18, 95% of the light is transmitted downstream to reception line 20, and only very small losses occur. In this manner very high sensitivity is obtained by the apparatus of the present invention. The light transmitted from coupler 16 through transmission line 18 exits line 18 at a point from about 0.01 to 3 millimeters, preferably about 1 millimeter, from reflective surface 22 on acoustical sensor 24. Acoustical sensor 24 is operated by the reception of sound waves 26 travelling in the direction of the arrows in the drawing and being directed to the reverse side of reflective surface 22 in the cone. Reflective surface 22 is a pressure sensitive membrane and it is positioned so that it moves longitudinally of the axis of transmission fiber 18 in response to pressure generated by the sound wave 26. The geometry and physical characteristics of this portion of the system will be defined with reference to FIGS. 2 and 3.

The light reflected back to transmission fiber 18 is modulated in accordance with the motion of the membrane, travels back through transmission fiber 18 to coupler 16 and outward to reception line 20. The end of reception line 20 is coupled to a photodiode or other light sensitive device 28, and the light signal thus generates an electrical signal at the photodiode which is transmitted to electronic receiver 30. The electronic signal is converted in receiver 30 to an appropriate signal for use. For instance, a preamplifier, amplifier, and frequency demodulator or band pass filter may be utilized to produce the desired result. If direct current drive of LED 12 is utilized, then a constant low amplitude signal is provided to the receiver by virtue of the small coupling loss at coupler 16. However, the reflected signal received through transmission line 18 is modulated by virtue of the motion of reflective surface 22. Thus, in this form, the electronic receiver would be designed to remove the constant low-level signal and amplify the modulated signal to provide the desired data. In the alternative, if LED 12 were modulated, for example, to increase its power and reduce its duty cycle, the modulation should be done at a fixed frequency and this frequency should be filtered out by the receiver. The change in frequency would be noted by the receiver and the resulting information, after filtering, would be transmitted elsewhere for further use.

Figure 2:
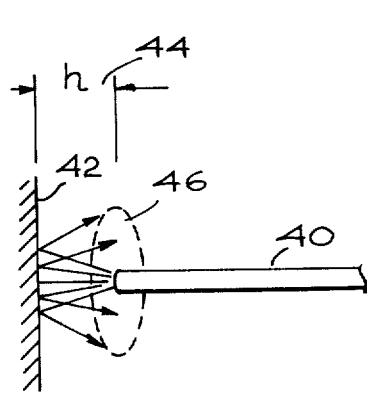
FIG. 2 is a schematic showing the light reflection at the sensor.

In FIG. 2, the geometry of the system which produces the very high sensitivity unit is shown. In this system, transmission fiber 40 is positioned a distance h, 44, away from pressure sensitive reflective membrane 42. The light exiting transmission line 40 has a conical pattern and thus is reflected back to the plane 46 which is perpendicular to and at the end fiber 40. The fiber has a numerical aperture (NA) equal to sin $\theta$, or 0.48 where $\theta$ is the half angle of the light cone emitted by the fiber.

Figure 3:
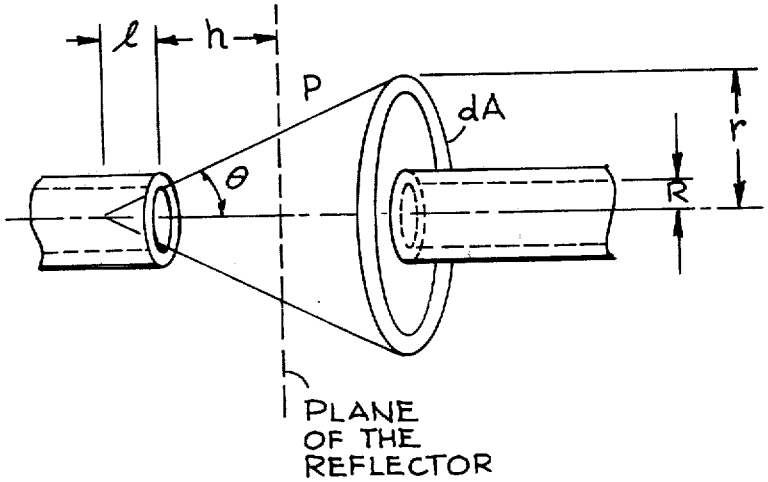
FIG. 3 is a geometric representation of the light pattern shown in FIG. 2.

The sensitivity of dynamic position sensing by this modulator is illustrated by the following brief analysis. Consider the geometry of the beam outside the fiber in the vicinity of the reflector. The reflection fiber is a Type 3000LC fiber manufactured by Galileo Electro-Optics, Inc. The fiber has a numerical aperture given by $$NA = \sin \theta = 0.48 \tag{1}$$

where $\theta$ is the half-angle of the light cone emitted by the fiber. When the diverging beam is reflected, the cone is folded back on itself. A similar configuration exists by unfolding the cone as shown in FIG. 3 and by placing a second fiber coaxial with the original fiber and at a distance from the original fiber equal to twice the distance separating the original fiber and the reflector. The optical power intercepted by the second fiber is proportional to the power emitted by the original fiber.

$$\Psi_{in} \alpha \Psi_{out} \quad (2)$$

where $\Psi_{out}$ is the optical flux out of the first fiber, and $\Psi_{in}$ is the optical flux into the second fiber.

The flux density, $\Phi$, radiating from the first fiber is approximately Lambertian:

$$\Phi = \Phi_o \cos \theta \text{ TM} \quad (3)$$

where $\Phi_o$ is the axial flux density, and $\theta$ is the off-axis angle as shown in FIG. 3. Then the flux into an incremental, coaxial ring area, dA, is $$d\Psi = \Phi dA = \Phi_o \cos \theta dA \quad (4)$$

The elemental area is $$dA = 2\pi \rho^2 d\theta = 2\pi(2h+1)^2 d\theta \quad (5)$$

where 1 is the distance from the end surface of the fiber to the apex of the cone of light emitted from the fiber, and 2h is the gap between fibers.

The entire flux from the first fiber is obtained by combining Equations (4) and (5) and integrating from $\theta = 0$ to $\theta = \theta_c$, the critical angle corresponding to the numerical aperture, (NA), of the fiber:

$$\Psi_{out} = 2\pi \Phi_o (2h+1)^2 \sin \theta_c \quad (6)$$

The input flux to the second fiber also is obtained by integrating Equations (4) and (5), but only to the angle subtended by the cone of the second fiber:

$$\Psi_{in} = 2\pi \Phi_o (2h+1)^2 R/[R^2 + (2h+1)^2]^{\frac{1}{2}} \quad (7)$$

Taking the ratio of Equations (7) and (6) gives the ratio of optical power levels $$P_{in}/P_{out} = \Phi_{in}/\Phi_{out} = R/(NA)[R^2 + (2h+1)^2]^{\frac{1}{2}} \quad (8)$$

For the fiber parameters used for the present devices, $R = 100 \mu m$, $(NA) = 0.48$, and $1 = 82m$, which results in $$P_{in}/P_{out} = 208/[10^4 + (2h+183)^2]^{2\frac{1}{2}} \quad (9)$$

where h is the actual spacing between the end surface of the bidirectional fiber and the reflecting surface.

A comparison of the theoretical expression in Equation (9) with the measured response is shown in FIG. 4. Both curves show the high degree of sensitivity of the reflected signal level relative to the position of the reflecting surface. The linear approximation also shown in FIG. 4 is a straight-line fit to the measured data for reflector positions close to the fiber end surface. The slope of the straight-line fit leads to a rate of response at the receiver output equal to 20 mV per micrometer of reflector displacement.

In the alternative, further increase in sensitivity can be achieved by utilizing a laser source instead of a light emitting diode, and an avalanche photodiode instead of a PIN photodiode. Typically, a small laser will increase the signal generation by an order of magnitude, i.e. 10 times, and an avalanche photodiode could be used to increase the eventual sensitivity by a factor of 5. For such a system, the displacement detection capabilities would be reduced to about 100 Angstroms.

Figure 5:
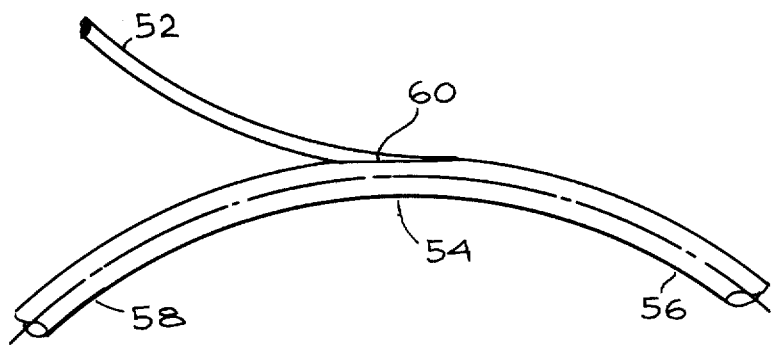
FIG. 5 is a schematic of the coupler used in the present invention.

In FIG. 5, the schematic of the directional coupler utilized in the present invention is illustrated. The light signal from the LED or other light source is provided to the coupler through input line 52 and is coupled to throughput fiber 54 which has transmission element 56 and reception element 58. In both cases, glass-clad glass fibers are utilized, and the diameter of input fiber 52 is significantly smaller than throughput fiber 54, as described in more detail in the above-identified application. Contact surface 60 is utilized to couple the light in input fiber 52 and transmit it downstream through transmission line 56, with only a very small coupling back to reception line 58. In the alternative, when light travels toward the coupler through transmission line 56 it is not coupled into input line 52, but continues to reception line 58. This coupler allows the use of a single-fiber apparatus of the present invention. As a result of the single-fiber apparatus, focusing lenses are not required, and aberrations in the reflective surface due to the different positions of the input and output fibers do not occur. Thus, once transmission fiber 56 is properly coupled with and positioned adjacent the reflective membrane, the system is quite efficient and very sensitive. In addition, no electrical equipment is required in the area near the acoustical pick-up, and the resulting system may be used in electrically hostile environments, such as under water or in high electromagnetic fields. Lastly, the use of a single coupler and single optical fiber, as opposed to bundles and multiple couplers, improves efficiency because the signal losses evident in such other systems do not occur.

Fiber 14 of FIG. 1 and fiber 52 of FIG. 5 may be a continuous optical fiber, or may be coupled together by standard optical connectors. Also, fiber 20 of FIG. 1 and fiber 58 of FIG. 5 may be a single continuous fiber or in-line coupled single fibers. In this manner photodiode 28 and light-emitting diode 12 may be located immediately adjacent coupler 16, or may be remotely positioned. In addition, fiber 18 of FIG. 1 may be an extension of fiber 56 in FIG. 5 but it is preferably an independent fiber which is in-line coupled to fiber 56 at coupler 16. Additionally, repeaters and amplifiers may be added to the lines so that operation of the system over great distances may be obtained. Thus the modulator system may contain as few as two fibers but usually contains three or more.

Although there have been described above specific arrangements of an acoustical modulator for fiber optic transmission in accordance with the invention for the purposes of illustrating the manner in which the invention may be used to advantage, it will be appreciated that the invention is not limited thereto. For example, although the invention has been disclosed in the context of association with a membrane having a reflective surface the principles of the invention are equally applicable to any other type of acoustically sensitive receiver capable of having a reflective surface, and the like. Accordingly, any and all modifications and variations or equivalent arrangements which may occur to those skilled in the art should be considered to be within the scope of the invention as described in the appended claims.

What is claimed is:

1. A fiber optic acoustical modulator comprising:
   launch coupler means having an input port, a bidirectional port and an output port, the bidirectional and output ports being interconnected by a first single optical fiber, said input port communicating with said bidirectional port through a second single optical fiber connected to and terminating at said first fiber at a location between the bidirectional and output ports;

signal generating means adapted to provide an optical signal to said input port;

an acoustically sensitive membrane having an optically reflective surface;

a bidirectional single optical fiber having two ends, one end being optically connected to said bidirectional port and the other end positioned adjacent said reflective surface; and signal receiving means adapted to receive optical signals from and operatively connected to said output port, whereby signals from said generating means are provided to said input port; unidirectionally coupled to said first fiber by said second fiber; exit said coupler in the bidirectional fiber; are transmitted to, modulated and reflected by said reflective surface; returned to said bidirectional fiber; and transmitted from said bidirectional fiber to said receiving means through said first fiber in said coupler means.

2. The modulator of claim 1 further comprising single optical fiber means for connecting light from the signal generating means to said input port.

3. The modulator of claim 1 wherein the second fiber of the coupler means has its input port adjacent the signal generating means to receive directly the optical signals generated therein.

4. The modulator of claim 3 wherein the first fiber of the coupler means extends continuously between a point adjacent the reflective surface and the signal receiving means.

5. The modulator of claim 4 wherein the diameter of the second fiber is smaller than the diameter of the first fiber.

6. The modulator of claim 1 wherein the signal generating means further comprises a light-emitting diode.

7. The modulator of claim 1 wherein the signal receiving means further comprises a photodiode.

8. The modulator of claim 7 further comprising amplifying means coupled to said photodiode for amplifying the output of the photodiode.

9. The modulator of claim 1 wherein the bidirectional fiber is a glass-clad-glass fiber terminating from 0.01 to 3 mm from said reflective surface.

10. The modulator of claim 1 wherein the second fiber is joined at one end to the first fiber in a unidirectional light-transmitting junction for light entering the input port of the second fiber.

* * * * *